US009677925B2

(12) United States Patent
Terada et al.

(10) Patent No.: US 9,677,925 B2
(45) Date of Patent: Jun. 13, 2017

(54) LIQUID LEVEL DETECTION DEVICE AND MANUFACTURING METHOD OF LIQUID LEVEL DETECTION DEVICE

(71) Applicant: DENSO CORPORATION, Kariya, Aichi-pref. (JP)

(72) Inventors: Yoshifumi Terada, Toyota (JP); Kenji Isobe, Handa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 92 days.

(21) Appl. No.: 14/421,935

(22) PCT Filed: Aug. 2, 2013

(86) PCT No.: PCT/JP2013/004702
§ 371 (c)(1),
(2) Date: Feb. 16, 2015

(87) PCT Pub. No.: WO2014/030308
PCT Pub. Date: Feb. 27, 2014

(65) Prior Publication Data
US 2015/0192453 A1   Jul. 9, 2015

(30) Foreign Application Priority Data
Aug. 20, 2012   (JP) .................................. 2012-181718

(51) Int. Cl.
G01F 23/62   (2006.01)
G01F 23/32   (2006.01)
G01F 23/38   (2006.01)

(52) U.S. Cl.
CPC .............. *G01F 23/32* (2013.01); *G01F 23/38* (2013.01)

(58) Field of Classification Search
CPC ..... G01F 23/30–23/38; H01R 13/5216; H01R 13/5205; H01R 13/5221
See application file for complete search history.

(56) References Cited

U.S. PATENT DOCUMENTS 7,225,672 B2   6/2007   Tanaka et al.
7,377,163 B2   5/2008   Miyagawa
(Continued)

FOREIGN PATENT DOCUMENTS

JP   H04324323 A   11/1992
JP   H08250193 A    9/1996
(Continued)

OTHER PUBLICATIONS

International Search Report and Written Opinion (in Japanese with English Translation) for PCT/JP2013/004702, mailed Aug. 27, 2013; ISA/JP.

Primary Examiner — Peter Macchiarolo
Assistant Examiner — Nathaniel Kolb
(74) Attorney, Agent, or Firm — Harness, Dickey & Pierce, P.L.C.

(57) ABSTRACT

A housing of a liquid level detection device includes an inner case, which has a first wall portion, and a terminal, which has a projection that extends through the first wall portion and projects to an outside of the inner case. The first wall portion and the projection are covered with a covering portion. A first seal film, which connects between an outer peripheral surface of the projection and the first wall portion, is formed in an inside of the covering portion. A film thickness of the first seal film along an edge line of the terminal progressively increases toward the first wall portion.

17 Claims, 7 Drawing Sheets

(56) References Cited

U.S. PATENT DOCUMENTS

| | | | |
|---|---|---|---|
| 8,540,530 B2* | 9/2013 | Ohnishi | H01R 43/24 439/581 |
| 2004/0231415 A1* | 11/2004 | Okada | G01F 23/38 73/290 R |
| 2011/0165366 A1* | 7/2011 | Wang | B29C 45/14311 428/68 |
| 2012/0149243 A1* | 6/2012 | Ohnishi | H01R 43/24 439/626 |

FOREIGN PATENT DOCUMENTS

| | | | |
|---|---|---|---|
| JP | H10208807 A | 8/1998 | |
| JP | 4089522 B2 | 5/2008 | |
| JP | 4138527 B2 | 8/2008 | |

\* cited by examiner

FIG. 12

LIQUID LEVEL DETECTION DEVICE AND MANUFACTURING METHOD OF LIQUID LEVEL DETECTION DEVICE

CROSS REFERENCE TO RELATED APPLICATIONS

This application is a U.S. National Phase Application under 35 U.S.C. 371 of International Application No. PCT/JP2013/004702 filed on Aug. 2, 2013 and published in Japanese as WO 2014/030308 A1 on Feb. 27, 2014. This application is based on and claims the benefit of priority from Japanese Patent Application No. 2012-181718 filed on Aug. 20, 2012. The entire disclosures of all of the above applications are incorporated herein by reference.

TECHNICAL FIELD

The present disclosure relates to a liquid level detection device, which detects a level of a surface of a liquid, and a manufacturing method of the liquid level detection device.

BACKGROUND ART

A structure, which is placed at a location where the structure is immersed in fuel stored in a fuel tank of vehicle, is known to have a seal arrangement, which limits intrusion of liquid, such as the fuel, into an inside of the structure. An example of such a structure is a connector disclosed in the Patent Document 1. This connector includes a first molded body, a plurality of terminals, which extend through the first molded body and project to an outside of the first molded body, and a second molded body, which covers the first molded body and the terminals. A seal agent is filled around the terminals in a seal agent filling recess, which is formed in the first molded body. With the above described construction, the fluid, which enters into the inside of the second molded body along the terminals, is blocked by the seal agent filled in the seal agent filling space, so that intrusion of the fluid into a gap between the first molded body and the respective terminals is blocked.

The seal arrangement of the connector of the Patent Document 1 is formed by filling a large amount of the seal agent into the seal agent filling recess. Thus, due to the process of filling the large amount of the seal agent, the manufacturing operation of the connector is complicated. Furthermore, if the amount of the seal agent, which is filled into the seal agent filling recess, is reduced, the required reliability of the function of the seal agent for limiting the intrusion of the liquid into the inside of the first molded body may not be achieved.

CITATION LIST

PATENT DOCUMENT

Patent Document 1: JPH08-250193A

SUMMARY OF THE INVENTION

The present disclosure is made in view of the above disadvantages, and it is an objective of the present disclosure to provide a liquid level detection device, which can effectively limit intrusion of liquid along a terminal with a simple structure, and a manufacturing of such a liquid level detection device.

Solution

According to the present disclosure, there is provided a liquid level detection device, which includes a wall portion, a terminal, a covering portion, and a seal film. The terminal has a projection, which projects through the wall portion in a predetermined projecting direction. The covering portion covers the wall portion and the projection. The seal film covers a corresponding portion of an outer peripheral surface of the projection and connects between the corresponding portion of the outer peripheral surface and the wall portion in an inside of the covering portion. A film thickness of the seal film progressively increases toward the wall portion along the corresponding portion of the outer peripheral surface.

Furthermore, the present disclosure provides a manufacturing method of the liquid level detection device. In the manufacturing method of the liquid level detection device, there is formed a subassembly that includes a wall portion, and a terminal, which has a projection that projects through the wall portion in a predetermined projecting direction. Then, a seal material, which is dissolved in a solvent and is in a liquid state, is applied to the wall portion and the projection. Thereafter, the seal material is solidified to form a seal film that covers a corresponding portion of an outer peripheral surface of the projection and connects between the corresponding portion of the outer peripheral surface and the wall portion. A film thickness of the seal film progressively increases toward the wall portion along the corresponding portion of the outer peripheral surface. Then, a covering portion is molded from a resin material such that the covering portion covers the wall portion, and the seal film that in turn covers the corresponding portion of the outer peripheral surface of the terminal.

DESCRIPTION OF EMBODIMENTS

Various embodiments of the present disclosure will be described with reference to the accompanying drawings. In the following embodiments, similar components will be indicated by the same reference numerals and may not be redundantly descried for the sake of simplicity. In each of the following embodiments, if only a part of a structure is described, the remaining part of the structure is the same as that of the previously described embodiment(s). Furthermore, besides combinations of components explicitly described in the respective embodiments, a component(s) of one or more of the following embodiments may be partially combined with components of another one or more of the following embodiments even if such a combination(s) is not explicitly described in the following description as long as such a combination does not pose a disadvantage.

(First Embodiment)

Figure 1:
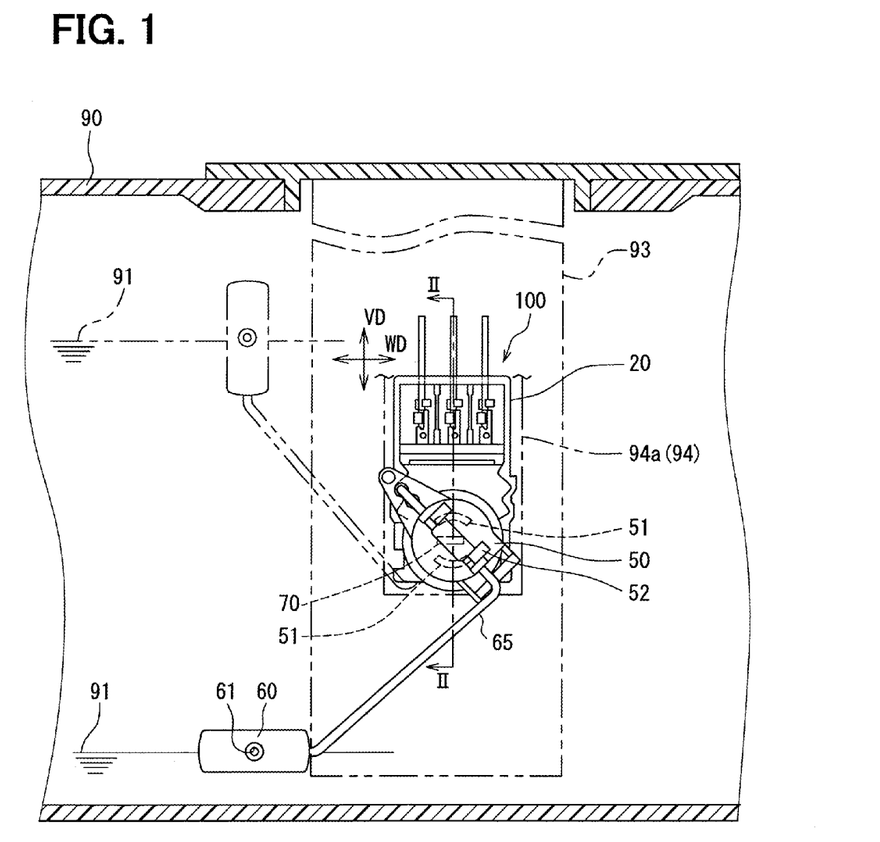
FIG. 1 is a front view of a liquid level detection device according to a first embodiment of the present disclosure.

As shown in FIG. 1, in a fuel tank (vessel) 90, which stores fuel (serving as liquid), a liquid level detection device 100 according to a first embodiment of the present disclosure is placed at a location where the liquid level detection device 100 is immersed in the fuel. In a state where the liquid level detection device 100 is held by a fuel pump module 93, the liquid level detection device 100 detects a level of a surface 91 of the fuel, which is stored in the fuel tank 90. The liquid level detection device 100 includes a housing 20, a float 60, a magnet holder 50, and a Hall IC 70.

Figure 2:
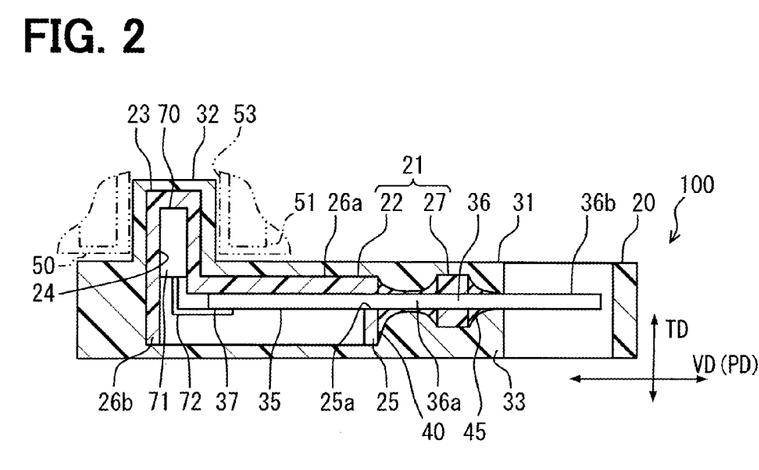
FIG. 2 is a cross sectional view taken along line II-II in FIG. 1.

The housing 20, which serves as a stationary body, is fitted from an upper side of FIG. 1 to an attachment portion 94a that is provided in a peripheral wall 94 of a subtank of the fuel pump module 93, so that the housing 20 is securely installed to the attachment portion 94a. As shown in FIG. 2, the housing 20 includes an inner case 21, a plurality of terminals (three terminals in the present embodiment) 35, and an outer case 31. The inner case 21 is made of a resin material, such as polyphenylene sulfide (PPS) resin. An inner case main body 22 of the inner case 21 is configured into a cup-shape vessel form by a bottom wall 26a, which is configured into a rectangular plate form, and a peripheral wall (side wall) 26b, which extends in a direction perpendicular to a plane of the bottom wall 26a along an outer peripheral edge portion of the bottom wall 26a. An inner shaft portion 23, a receiving chamber (a sensor receiving chamber or a sensing element receiving chamber) 24, and a first wall portion 25 are formed in the inner case main body 22. In the following description, a longitudinal direction of the bottom wall 26a will be referred to as a vertical direction VD, and a direction, which is substantially perpendicular to the longitudinal direction of the bottom wall 26a along the bottom wall 26a, will be referred to as a width direction WD (see FIG. 1). Furthermore, a plate thickness direction of the bottom wall 26a will be referred to as a thickness direction TD.

The inner shaft portion 23 projects from the bottom wall 26a in the thickness direction TD. The inner shaft portion 23 is placed on an opposite side of the bottom wall 26a, which is opposite from the peripheral wall 26b. The receiving chamber 24 is a space, which receives the Hall IC 70. The receiving chamber 24 is formed in an inside of the inner shaft portion 23.

The first wall portion 25 is a part of the peripheral wall 26b and is placed above the inner shaft portion 23 in the vertical direction VD. The first wall portion 25 is configured into a plate form and extends in the width direction WD. The first wall portion 25 has three through-holes 25a, which open in a wall surface 25b of the first wall portion 25. The through-holes 25a are openings for receiving the terminals 35 therethrough, and the through-holes 25a are arranged one after another at equal intervals in the width direction WD. The first wall portion 25 extends from each terminal 35 in a direction, which is substantially perpendicular to the terminal 35 that is received through the corresponding through-hole 25a. More specifically, the first wall portion 25 contacts each terminal 35 and continuously surrounds an outer peripheral portion of the terminal 35 along an entire circumferential extent of the terminal 35. Specifically, the first wall portion 25 seamlessly extends along the entire circumferential extent of the terminal 35 in the circumferential direction.

The terminal 35 is configured into a band form and is made of an electrically conductive material, such as bronze. The three terminals 35 are embedded in the inner case main body 22. A cross section of each terminal 35, which is taken in a direction perpendicular to a longitudinal direction of the terminal 35, i.e., a transverse cross section of each terminal 35 is configured into a rectangular form. Each terminal 35 is received through a corresponding one of the three through-holes 25a and thereby penetrates through the first wall portion 25. Furthermore, each terminal 35 includes a projection 36 and a connecting portion (proximal end portion) 37.

The projection 36 is formed by a portion of the terminal 35, which extends from the connecting portion 37 and projects from the first wall portion 25 to the outside of the inner case 21. The projection 36 projects upward in the vertical direction VD (hereinafter referred to as a projecting direction PD). An area around a distal end part 36b of the projection 36, which is located distally in the projecting direction PD, is exposed to the outside of the housing 20. In contrast, a proximal end part 36a of the projection 36, which is closer to the first wall portion 25 in comparison to the distal end part 36b, is covered with the outer case 31. The connecting portion 37 is formed by a portion of the terminal 35, which is received in the inside of the inner case main body 22. In the terminal 35, the connecting portion 37 is located on an opposite side, which is opposite from the distal end part 36b in the longitudinal direction of the terminal 35. The connecting portion 37 is connected to the Hall IC 70.

The outer case 31 is formed by a resin material, such as the PPS resin. The outer case 31 is formed to cover an outer side of the inner case 21, so that the outer case 31 receives the inner case 21. The outer case 31 includes an outer shaft portion 32 and a covering portion 33.

The outer shaft portion 32 is configured into a cylindrical tubular form and covers an outer side of the inner shaft portion 23. An axial direction of the outer shaft portion 32 extends in the thickness direction TD. The outer shaft portion 32 is inserted into the magnet holder 50, which serves as a rotatable body, so that the outer shaft portion 32 rotatably supports the magnet holder 50. The covering portion 33 is formed along the projecting direction PD of the first wall portion 25 and extends in the width direction WD. The covering portion 33 covers the first wall portion 25 and the proximal end part 36a from two sides, which are opposite to each other in the thickness direction TD, to protect the first wall portion 25 and the proximal end part 36a.

The float 60, which is shown in FIG. 1, is formed from a material, such as expanded ebonite, which has a specific gravity that is smaller than a specific gravity of the fuel. The float 60 can float on the surface 91 of the fuel. The float 60 is supported by the magnet holder 50 through a float arm 65. The float arm 65 is made of a metal material, such as stainless steel, and is received through a through-hole 61, which is formed in the float 60.

The magnet holder 50, which is shown in FIGS. 1 and 2, is made of, for example, a resin material and is configured into a circular disk form. A fixing portion 52 and a bearing portion 53 are formed in the magnet holder 50. In addition, two magnets 51 are received in the magnet holder 50. The magnet holder 50 rotates integrally with the magnets 51 relative to the housing 20 to follow the surface 91 of the fuel.

The fixing portion 52 is formed in a top surface of the magnet holder 50, which faces a side that is opposite from the housing 20. The fixing portion 52 holds the float arm 65. The bearing portion 53 is formed in a center part of the magnet holder 50, which is centered in a radial direction. A cylindrical hole, which extends in the axial direction of the magnet holder 50, is formed in the bearing portion 53. The bearing portion 53 is fitted to the outer side of the outer shaft portion 32. The two magnets 51 are arranged to oppose with each other about the bearing portion 53, so that the magnets 51 generate a magnetic flux, which passes through the Hall IC 70 received in the receiving chamber 24.

The Hall IC 70, which is shown in FIG. 2, is a sensor (sensing element), which senses a relative angle of the magnet holder 50 relative to the housing 20. The Hall IC 70 includes a main body 71 and three lead lines 72. The main body 71 is received in the receiving chamber 24 in such a manner that the main body 71 is held between the two magnets 51. Each lead line 72 extends from the main body 71 and is connected to the connecting portion 37 of the corresponding terminal 35. In a state where a voltage is applied to the Hall IC 70, a magnetic field, which is generated from the magnets 51, is applied to the main body 71 of the Hall IC 70. Thereby, the Hall IC 70 generates a voltage that is proportional to a density of a magnetic flux that passes through the Hall IC 70. A voltage, which is generated in the Hall IC 70, is measured with an external device through the corresponding lead line 72 and the corresponding terminal 35. Specifically, the Hall IC 70 is electrically connected to the external device through the three terminals 35.

Next, a characteristic feature of the liquid level detection device 100 will be described with reference to FIGS. 3 to 6. In addition to the inner case main body 22, the inner case 21 of the liquid level detection device 100 includes a plurality of blocking wall bodies 27 (three blocking wall bodies 27 in the present embodiment), which serve as protruding portions. Furthermore, a first seal film 40 and a second seal film 45 are provided in the liquid level detection device 100.

Figure 3:
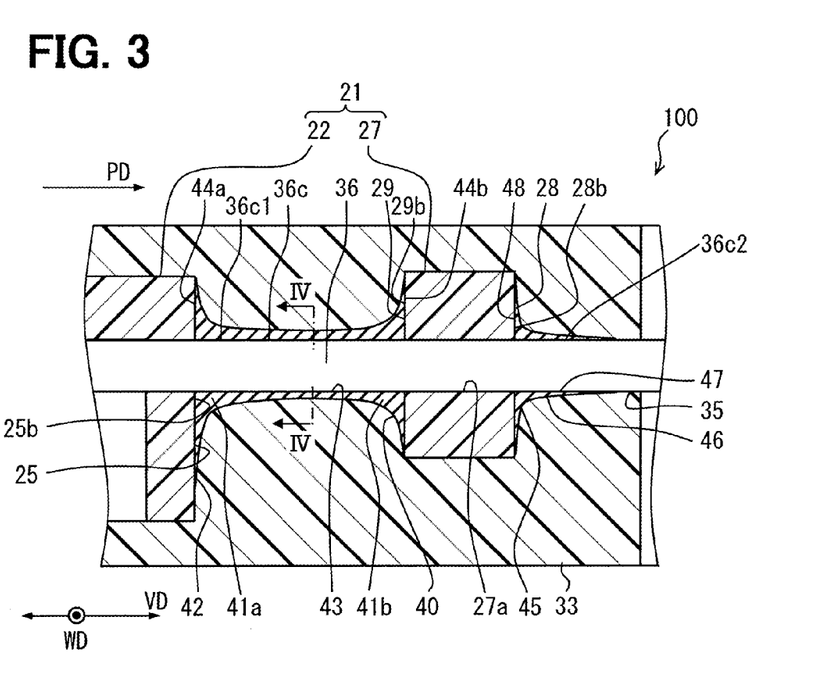
FIG. 3 is an enlarged view of an area around a first seal film and a second seal film according to the first embodiment.
Figure 4:
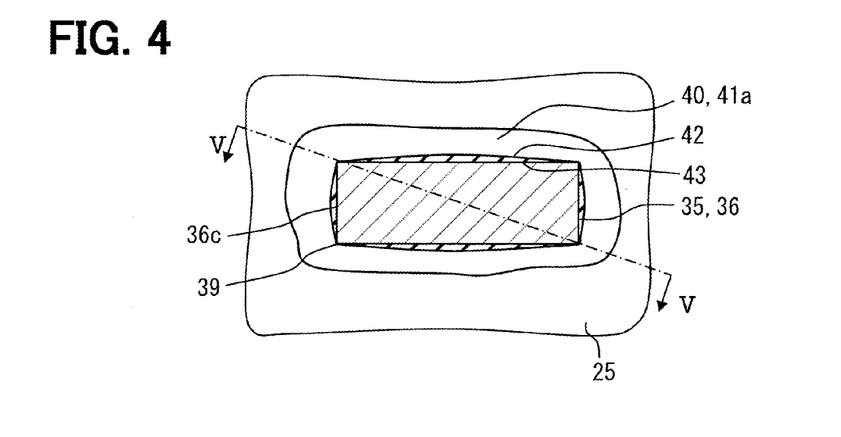
FIG. 4 is a cross-sectional view taken along line IV-IV in FIG. 3.
Figure 5:
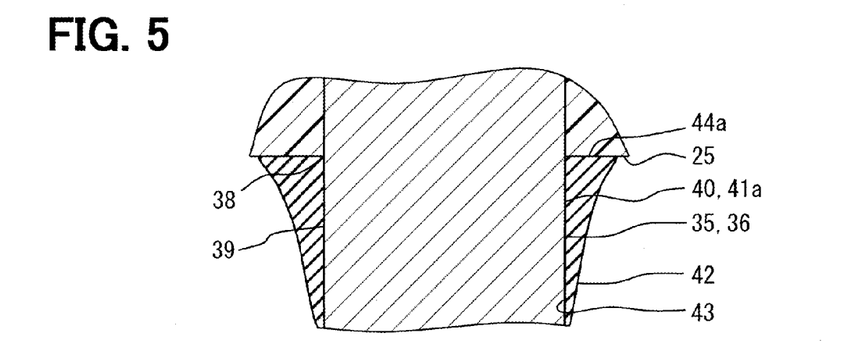
FIG. 5 is a cross-sectional view taken along line V-V in FIG. 4, schematically showing a change in a film thickness on an edge line of a terminal.
Figure 6:
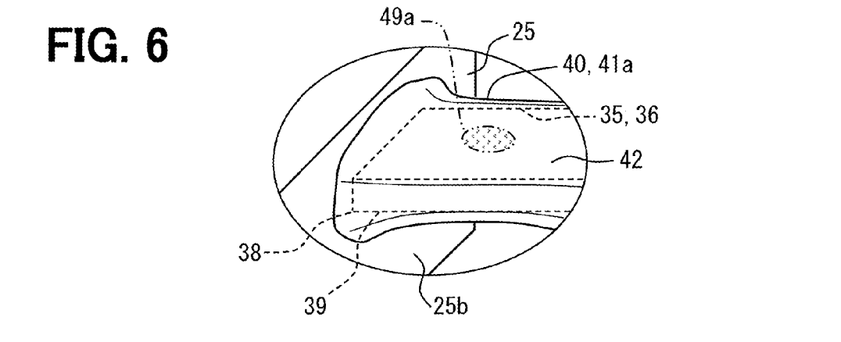
FIG. 6 is a perspective view of an area around the seal film according to the first embodiment.

The blocking wall body 27 shown in FIG. 3 is configured into a cuboid form and is placed in the inside of the covering portion 33. Each blocking wall body 27 is spaced from the inner case main body 22 in the projecting direction PD of the projection 36. The blocking wall bodies 27 are provided to the terminals 35, respectively. Each adjacent two of the three blocking wall bodies 27 are spaced from each other. A terminal receiving hole 27a, a second wall portion 28, and a third wall portion 29 are formed in each blocking wall body 27.

The terminal receiving hole 27a is a through-hole that extends through the blocking wall body 27 in the vertical direction VD. The terminal receiving hole 27a extends from one of the second wall portion 28 and the third wall portion 29 to the other one of the second wall portion 28 and the third wall portion 29. Each of two openings of the terminal receiving hole 27a, which open to a wall surface 28b of the second wall portion 28 and a wall surface 29b of the third wall portion 29, respectively, is configured into a rectangular form, which corresponds to the configuration of the cross section of the projection 36. Therefore, the projection 36 of each terminal 35, which is received through the corresponding terminal receiving hole 27a, is engaged with an inner wall surface of the terminal receiving hole 27a.

The second wall portion 28 and the third wall portion 29 are spaced from the first wall portion 25 in the projecting direction PD of the projection 36. The second wall portion 28 is formed by one of outer wall surfaces of the blocking wall body 27, which is oriented in the projecting direction PD. In contrast, the third wall portion 29 is formed by another one of the outer wall surfaces of the blocking wall body 27, which is oriented in a direction that is opposite from the projecting direction PD. The third wall portion 29 is opposed to the first wall portion 25 in the vertical direction VD. Each of the second wall portion 28 and the third wall portion 29 projects in a direction, which is perpendicular to the projecting direction PD, from the projection 36, which is received in the terminal receiving hole 27a, so that each of the second wall portion 28 and the third wall portion 29 surrounds an outer peripheral part of the projection 36 along an entire circumferential extent of the projection 36.

The first seal film 40 and the second seal film 45 are embedded in the covering portion 33. Specifically, the covering portion 33 contacts each seal film 40, 45 and seamlessly extends in the circumferential direction all around the entire circumferential extent of the seal film 40, 45. In other words, the covering portion 33 covers two projecting sections of the proximal end part 36a of the projection 36, which project from the blocking wall body 27, through the seal films 40, 45. Furthermore, a portion of each seal film 40, 45, which is located on the corresponding wall portion 25, 28, 29 placed adjacent to the corresponding hole 25a, 27a, is held between the corresponding wall portion 25, 28, 29 and the covering portion 33 in the projecting direction PD. Specifically, the portion of each seal film 40, 45 extends radially outward from the proximal end part 36a of the projection 36 along the corresponding wall portion 25, 28, 29, and a film thickness of the seal film 40, 45, which is measured from a surface of the proximal end part 36a in the radial direction, is increased on the corresponding wall portion 25, 28, 29. For the fuel, which penetrates into the covering portion 33 along each corresponding terminal 35, each seal film 40, 45 limits intrusion of the fuel into the inside of the inner case main body 22 through a gap between the first wall portion 25 and the terminal 35. The first seal film 40, which is shown in FIGS. 3 to 6, is formed between the first wall portion 25 and the third wall portion 29 along the projection 36. The first seal film 40 forms an outer case contact surface (serving as a contact surface) 42, which tightly contacts the covering portion 33, a terminal contact surface 43, which tightly contacts the projection 36, an inner case contact surface 44a, which tightly contacts the first wall portion 25, and a blocking wall body contact surface 44b, which tightly contacts the third wall portion 29. The first seal film 40 includes a main film portion 41a and an auxiliary film portion 41b. The main film portion 41a is formed continuously to connect between a corresponding portion 36c1 of the outer peripheral surface 36c of the projection 36 (specifically, four side surfaces of the projection 36) and the wall surface (also referred to as an end surface) 25b of the first wall portion 25. The auxiliary film portion 41b is formed continuously to connect between the corresponding portion 36c1 of the outer peripheral surface 36c of the projection 36 and the wall surface (also referred to as an end surface) 29b of the third wall portion 29.

The main film portion 41a covers a gap, which is formed between the first wall portion 25 and the terminal 35. In the main film portion 41a, the outer case contact surface 42 is progressively spaced away from the terminal contact surface 43 as the outer case contact surface 42 approaches the first wall portion 25 along the terminal 35. In this way, in the main film portion 41a, the film thickness of the first seal film 40 progressively increases toward the first wall portion 25.

The auxiliary film portion 41b covers a gap, which is formed between the third wall portion 29 and the projection 36. In the auxiliary film portion 41b, the outer case contact surface 42 is progressively spaced away from the terminal contact surface 43 as the outer case contact surface 42 approaches the third wall portion 29 along the terminal 35. In this way, in the auxiliary film portion 41b, the film thickness of the first seal film 40 progressively increases toward the third wall portion 29.

The second seal film 45, which is shown in FIG. 3, is a different seal film that is different from the first seal film 40. The second seal film 45 is formed to extend in the projecting direction PD along the projection 36. The second seal film 45 is formed continuously to connect between a corresponding portion 36c2 of the outer peripheral surface 36c of the projection 36 and the wall surface (also referred to as an end surface) 28b of the second wall portion 28. The second seal film 45 covers a gap, which is formed between the second wall portion 28 and the projection 36. The second seal film 45 forms an outer case contact surface (serving as a contact surface) 46, which tightly contacts the covering portion 33, a terminal contact surface 47, which tightly contacts the projection 36, and a blocking wall body contact surface 48, which tightly contacts the second wall portion 28. The outer case contact surface 46 is progressively spaced from the terminal contact surface 47 as the outer case contact surface 46 approaches the second wall portion 28 along the terminal 35. In this way, the film thickness of the second seal film 45 increases as the second seal film 45 approaches the second wall portion 28.

The manufacturing method of the liquid level detection device 100, which includes a process of forming the first seal film 40 and the second seal film 45, will be described with reference to FIGS. 3 and 7 to 8(c).

Figure 7:
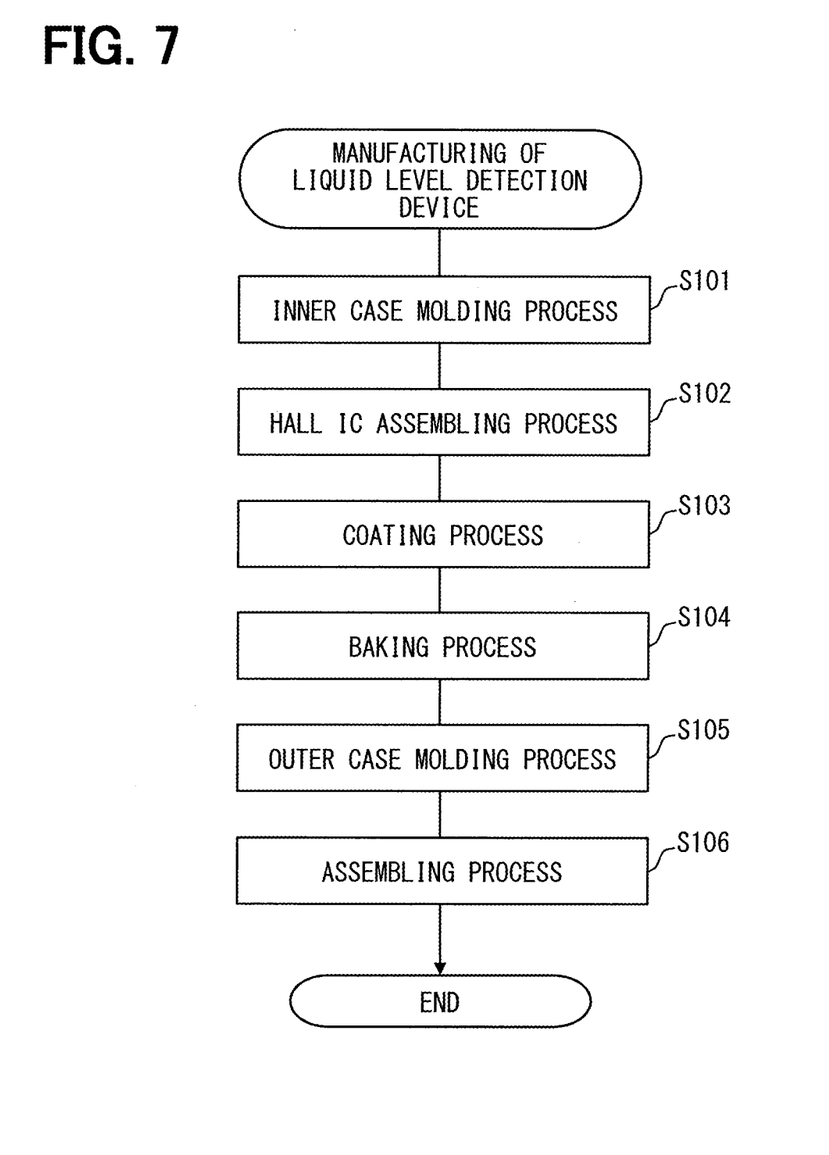
FIG. 7 is a flowchart showing a manufacturing method of the liquid level detection device according to the first embodiment.
Figure 8:
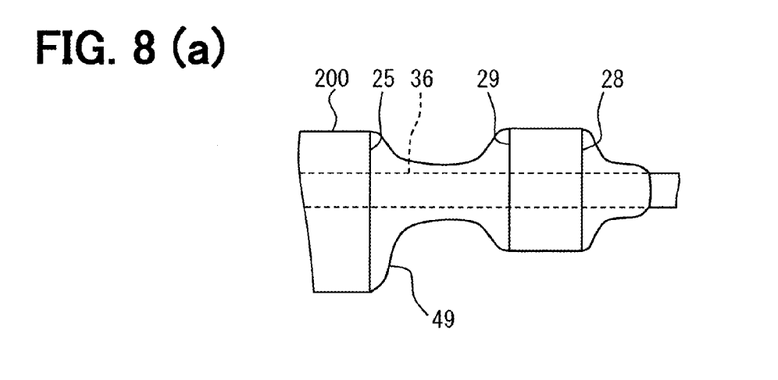
FIG. 8(a) is a schematic diagram showing a coating process of the manufacturing method of the liquid level detection device according to the first embodiment.
FIG. 8(b) is a schematic diagram showing a baking process according to the first embodiment.
FIG. 8(c) is a schematic diagram showing an outer case molding process according to the first embodiment.

In an inner case molding process, which is executed in step S101 of FIG. 7, a molding die, which has a cavity that corresponds to a shape of the inner case 21, is prepared, and each terminal 35 is fixed in the cavity of the molding die. Then, the PPS resin in the molten state is filled in the cavity. By the insert molding discussed above, the inner case 21, in which the terminals 35 are embedded, is formed. In addition, when each terminal 35 is embedded in the inner case 21 in the state where the terminal 35 extends through the first wall portion 25 and the blocking wall body 27, the projection 36 of the terminal 35 is provided.

In a Hall IC assembling process, which is executed in step S102 of FIG. 7, the main body 71 of the Hall IC 70 (see FIG. 2) is received in the receiving chamber 24 (see FIG. 2), which is formed in the inner case main body 22. Next, the lead lines 72 (see FIG. 2) are joined to the connecting portions 37, respectively, which are placed in the inner case main body 22. In this way, a subassembly 200 is formed.

In a coating process (see FIG. 8(a)), which is executed at step S103 of FIG. 7, a primer 49 is coated to a corresponding extent of the subassembly 200, which is from the projection 36 to the wall surface 25b of the first wall portion 25, and a corresponding extent of the subassembly 200, which is from the projection 36 to the wall surface 29b of the third wall portion 29. Furthermore, the primer 49 is also coated to a corresponding extent, which is from the projection 36 to the wall surface 28b of the second wall portion 28. The primer 49, which is coated in the above coating process, is prepared in a liquid state by solving a seal material, such as hydrin rubber (e.g., epichlorohydrin rubber), into solvent, such as toluene. The coated primer 49 is bulged by a surface tension thereof relative to the projection 36, and the wall surfaces 25b, 28b, 29b of the first to third wall portions 25, 28, 29.

In a baking process (see FIG. 8(b)), which is executed at step S104 of FIG. 7, the primer 49, which is applied in the coating process, is heated or is held under the room temperature to volatilize the solvent, such as the toluene. Thereafter, in order to bake the primer 49, the primer 49 is heated for about 30 minutes under the temperature of 150 degrees Celsius. In this way, while toluene is volatilized, the hydrin rubber is tensioned by the surface tension and is solidified into a solid state on the projection 36, and the first to third wall portions 25, 28, 29. Thereby, the film thickness of each seal film 40, 45 progressively increases toward each corresponding one of the first to third wall portions 25, 28, 29. Thereby, the film thickness of each seal film 40, 45 along each corresponding edge line 39 of the terminal 35 progressively increases toward each corresponding one of the first to third wall portions 25, 28, 29. Thereby, even in a corner 38 (see FIGS. 4 to 6) along the edge line 39, at which the film thickness tends to be reduced, each corresponding seal film 40, 45 is not lost, so that the corresponding projection 36 can be covered with the seal film 40, 45.

In addition, air bubbles, which are initially contained in the primer 49, come out from a surface of the primer 49, which later becomes the corresponding outer case contact surface 42, 46. In this way, small surface asperity 49a (partially and schematically shown in FIG. 6) is formed along the entire surface of the outer case contact surface 42, 46 of each of the seal films 40, 45 upon completion of the baking process. The surface roughness of the surface asperity 49a of the respective outer case contact surfaces 42, 46 is larger (rougher) than, for example, the surface roughness of the inner case main body 22.

In the outer case molding process (see FIG. 8(c)), which is executed at step S105 of FIG. 7, a molding die 80, which has a cavity 81 corresponding to the shape of the outer case 31, is prepared, and the subassembly 200, which includes the inner case 21 and the terminals 35 having the seal films 40, 45, is fixed in the cavity 81. Then, the PPS resin in the molten state is filled in the cavity 81. When the outer case 31 is molded in this way, the housing 20, in which the inner case 21, the Hall IC 70, and portions of the terminals 35 are embedded, is formed. The housing 20, in which the inner case 21, the Hall IC 70, and the portions of the terminals 35 are embedded, is also referred to as a sensor assembly. In the inner case main body 22 of FIG. 2, the PPS resin, which is filled around the lead lines 72 of the Hall IC and the connecting portions 37 of the terminals 35, is not depicted for the purpose of indicating the internal structure of the inner case main body 22.

In the outer case molding process discussed above, the PPS resin in the molten state is filled over the small surface asperities 49a (see FIG. 6), which are formed in the outer case contact surfaces 42, 46. In this way, the covering portion 33 bites into the respective seal films 40, 45, so that the seal films 40, 45 is not likely displaced relative to the covering portion 33, to which the seal films 40, 45 contact.

In an assembling process at step S106 of FIG. 7, the magnet holder 50 and the float arm 65 holding the float 60 shown in FIG. 1 are sequentially assembled to the housing 20, which is formed in the outer case molding process. When the assembling process is completed, the manufacturing of the liquid level detection device 100 is completed.

In the first embodiment discussed above, the film thickness of the first seal film 40, which is located on the edge line 39, is thickened in an area that is from the outer peripheral surface 36c of the projection 36 to the first wall portion 25. Therefore, the intrusion of the fuel can be limited even with the small amount of the seal material. Thus, there is implemented the liquid level detection device 100, which can effectively limit the intrusion of the liquid into the inside of the inner case 21 without using the structure, which complicates the manufacturing operation.

Furthermore, according to the first embodiment, the second seal film 45 limits the intrusion of the fuel to the location adjacent to the inner case main body 22 through the gap between the blocking wall body 27 and the projection 36. In addition, the auxiliary film portion 41b of the first seal film 40 also limits the intrusion of the fuel to the location adjacent to the inner case main body 22 through the gap between the blocking wall body 27 and the projection 36. As discussed above, the intrusion of the fuel to the location adjacent to the inner case main body 22 is limited by the second seal film 45 and the auxiliary film portion 41b, so that the intrusion of the fuel into the inside of the inner case main body 22 is further effectively limited.

In addition, the film thickness of the second seal film 45 increases as the second seal film 45 approaches the second wall portion 28. Thus, the film thickness of the second seal film 45, which covers the gap between the second wall portion 28 and the projection 36, can be sufficiently ensured. Furthermore, the film thickness of the auxiliary film portion 41b increases as the auxiliary film portion 41b approaches the third wall portion 29. Thus, the film thickness of the auxiliary film portion 41b, which covers the gap between the third wall portion 29 and the projection 36, can be sufficiently ensured. As a result, the function of the respective seal films 40, 45, which limit the intrusion of the fuel to the location adjacent to the inner case main body 22, can be implemented with the high reliability.

Furthermore, according to the first embodiment, even at the corner 38 along the edge line 39, at which it is difficult to ensure the sufficient film thickness, the seal film 40, 45 can have the sufficient film thickness. As discussed above, when each seal film 40, 45, which has the film thickness that progressively increases, is applied to the projection 36 that has the cross section, which is configured into the polygonal form, such as the rectangular form, the function of the seal film 40, 45 for limiting the intrusion of the fuel into the inside of the inner case main body 22 can be effectively implemented.

In addition, according to the first embodiment, the surface asperity 49a of each seal film 40, 45 limits the removal of the seal film 40, 45 from the first to third wall portions 25, 28, 29. Therefore, the reliability of each seal film 40, 45 is further improved.

Furthermore, according to the first embodiment, each adjacent two of the terminals 35 have the blocking wall bodies 27, respectively, which are spaced from each other. Therefore, it is possible to avoid accumulation of the fuel between these blocking wall bodies 27 and the location around the second seal films 45, which are respectively applied to the blocking wall bodies 27. Therefore, the second seal film 45 can stably implement the function of limiting the intrusion of the fuel to the location adjacent to the inner case main body 22.

Furthermore, according to the first embodiment, toluene is volatilized in the baking process after the coating of the primer 49 in the liquid state in the coating process. Thereby, each seal film 40, 45 can obtain the corresponding configuration having the film thickness that increases as the film 40, 45 approaches the corresponding one of the first to third wall portions 25, 28, 29. Therefore, each seal film 40, 45 can limit the intrusion of the fuel into the inside of the inner case main body 22. In addition, the first seal film 40 is formed through the coating process and the baking process. Therefore, the complication of the processes involved in the manufacturing of the liquid level detection device 100 can be reliably avoided.

(Second Embodiment)

Figure 9:
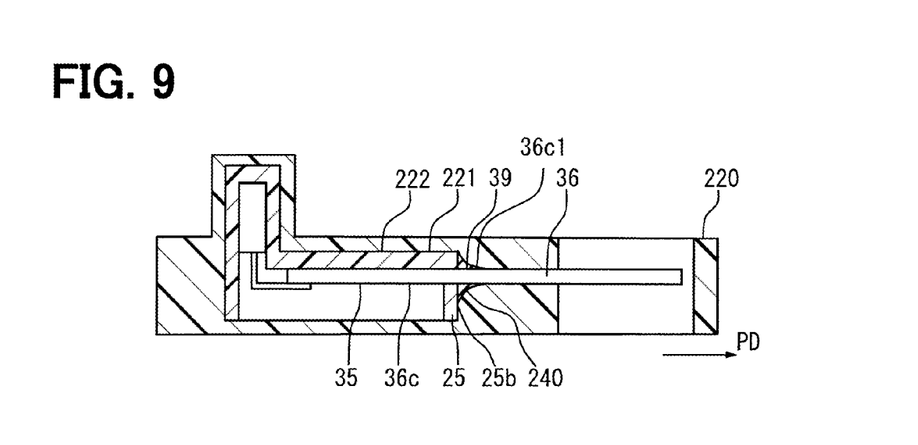
FIG. 9 is a longitudinal cross-sectional view of a housing according to a second embodiment of the present disclosure.

A second embodiment of the present disclosure shown in FIG. 9 is a modification of the first embodiment. The blocking wall bodies 27 (see FIG. 2) and the second seal films 45 (see FIG. 2) of the first embodiment are eliminated from a housing (stationary body) 220 of the second embodiment. Similar to the main film portion 41a (see FIG. 2) of the first embodiment, a seal film (first seal film) 240 of the second embodiment extends from a first wall portion 25 of an inner case main body 222 of an inner case 221 in the projecting direction PD along the projection 36. The seal film 240 is configured such that the film thickness of the seal film 240 progressively increases toward the first wall portion 25 along the edge line 39, and the seal film 240 covers the gap formed between the first wall portion 25 and the projection 36.

The seal film 240 of the second embodiment discussed above has the structure that is simpler than that of the first seal film 40 (see FIG. 2) of the first embodiment. Thereby, the complication of the manufacturing processes of the liquid level detection device can be further limited. In addition, even with the simple seal film 240, it is possible to implement the sufficient film thickness of the portion of the seal film 240, which covers the gap between the first wall portion 25 and the terminal 35, particularly, even along the edge line 39. Therefore, the required reliability of the function of the seal film 240, which limits the intrusion of the fuel into the inside of the inner case 221, can be achieved. Thereby, even in the case of the liquid level detection device of the second embodiment, it is possible to achieve the advantage of limiting the intrusion of the fuel into the inside of the inner case 221 while avoiding the complication of the manufacturing processes of the liquid level detection device.

(Third Embodiment)

Figure 10:
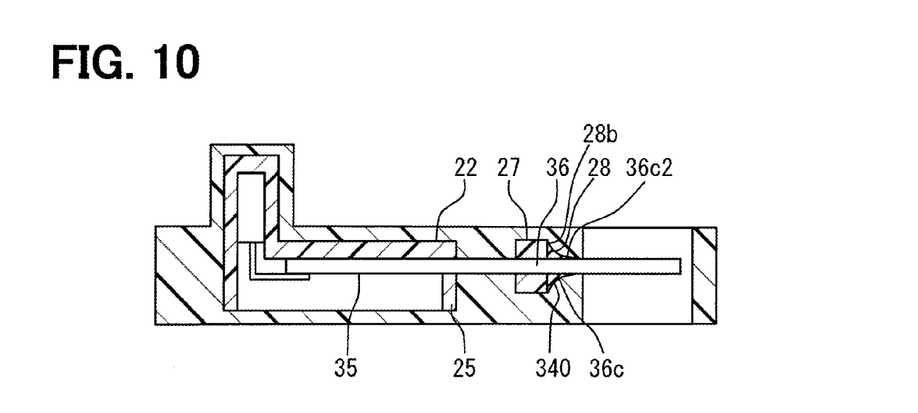
FIG. 10 is a longitudinal cross-sectional view of a housing according to a third embodiment of the present disclosure.

A third embodiment of the present disclosure shown in FIG. 10 is another modification of the first embodiment. The first seal film 40 (see FIG. 3) of the first embodiment is eliminated from the liquid level detection device of the third embodiment. Therefore, a seal film (second seal film) 340 is substantially the same as the second seal film 45 (see FIG. 3) of the first embodiment.

With the above-described structure, the intrusion of the fuel to the location adjacent to the inner case main body 22 through the gap between the blocking wall body 27 and the projection 36 can be limited by the seal film 340, which covers this gap. Therefore, even though the seal film 340 does not directly cover the gap between the first wall portion 25 and the terminal 35, it is possible to limit the intrusion of the fuel into the inside of the inner case main body 22.

In addition, the seal film 340 has the structure that is simpler than that of the first seal film 40 (see FIG. 2) of the first embodiment. Thereby, the complication of the manufacturing processes of the liquid level detection device can be further limited. Therefore, even in the case of the liquid level detection device of the third embodiment, it is possible to achieve the advantage of limiting the intrusion of the fuel into the inside of the inner case 221 while avoiding the complication of the manufacturing processes of the liquid level detection device.

(Modifications)

The present disclosure has been described with reference to the above embodiments. However, the present disclosure is not limited to the above embodiments, and the present disclosure can be applied to various other embodiments and a combination thereof within the principle of the present disclosure.

Figure 11:
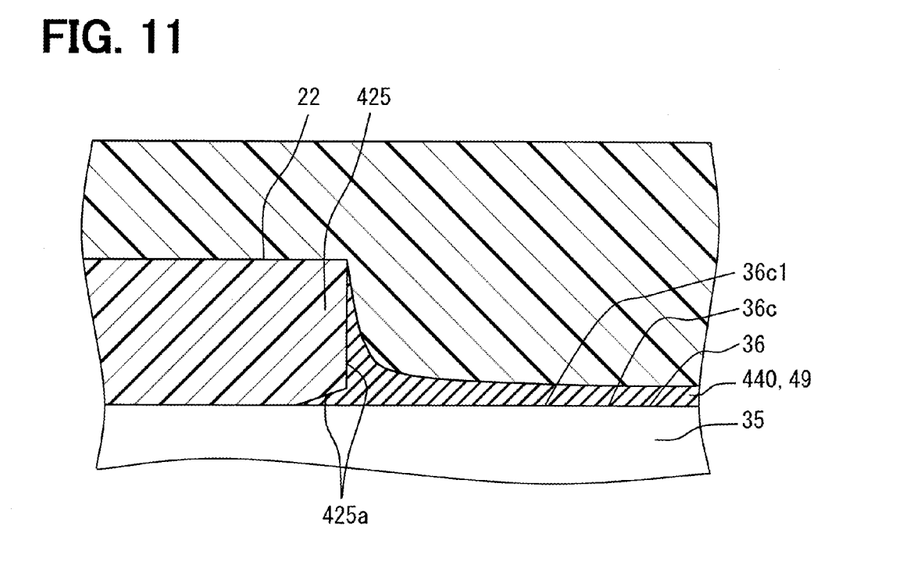
FIG. 11 is a schematic diagram showing a modification of a first wall portion of the first embodiment.

In the first embodiment, the wall surface 25b of the first wall portion 25 extends from the terminal 35 in the direction substantially perpendicular to the terminal 35. However, the angle, which is defined by the wall surface 25b of the first wall portion 25 relative to the terminal 35, may be appropriately changed. For example, as shown in FIG. 11, an angle of a wall surface 425a of a first wall portion 425 relative to the terminal 35 may be an acute angle. When the wall surface 425a of the first wall portion 425 is formed to have the acute angle, the primer 49 can easily enter the gap between the first wall portion 425 and the terminal 35. When the amount of the primer 49, which is applied in the coating process, is increased in this manner, the function of the seal film 440, which limits the intrusion of the fuel into the inside of the inner case 21, can be further improved.

Figure 12:
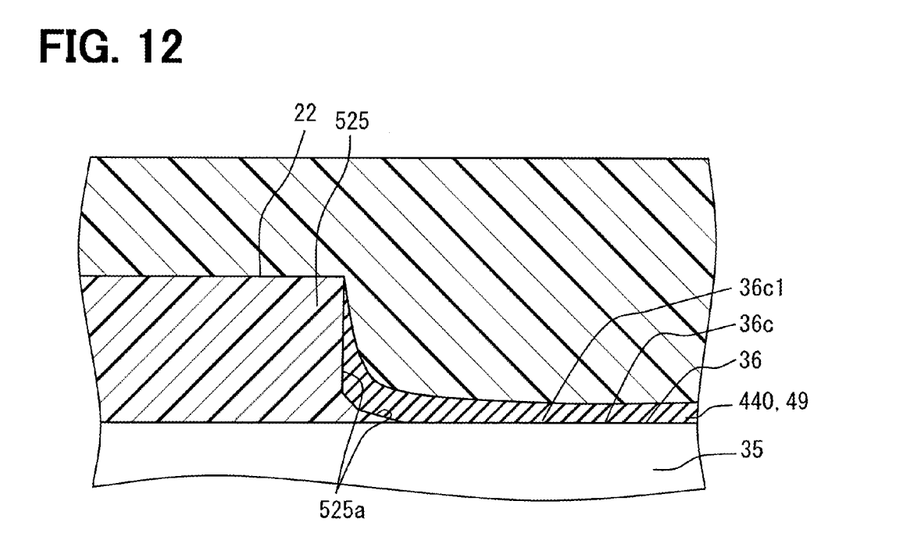
FIG. 12 is a schematic diagram showing a modification of the first wall portion of the first embodiment.

Furthermore, as shown in FIG. 12, an angle, which is defined by a wall surface 525a of a first wall portion 525, may be an obtuse angle. When the wall surface 525a of the first wall portion 525 is formed to have the obtuse angle, the operational work of coating the primer 49 to the area around the first wall portion 525 and the terminal 35 is eased in the coating process.

Furthermore, the wall surface 28b of the second wall portion 28 and the wall surface 29b of the third wall portion 29 in the first embodiment may be modified to define the acute angle or the obtuse angle relative to the terminal 35. Furthermore, similarly, the wall surface 25b of the first wall portion 25 in the second embodiment and the wall surface 28b of the second wall portion 28 in the third embodiment may be modified to define the acute angle or the obtuse angle relative to the terminal 35.

In the above embodiments, the cross section of the terminal 35 is configured into the rectangular form. However, the configuration of the terminal may be appropriately changed to any other form. For example, the cross section of the terminal may be configured into an ellipse form. Furthermore, the cross section of the terminal may be configured into another polygonal form, such as a triangular form, a pentangular form or a polygonal form having more than five sides. The edge line 39 of the terminal is defined as a part of the cross section of the terminal, at which a contour of the cross section rapidly changes in comparison to the other part(s) of the cross section. In a case of the terminal, which has the cross section configured into the ellipse form, the edge line is formed at each of two end parts of the ellipse, which are opposed to each other in a direction of a major axis of the ellipse form. Furthermore, in the case of the terminal, which has the cross section configured into the polygonal form, the edge line is formed at each corner of the polygonal form. Furthermore, a terminal, which has a cross section that is configured into a circular form having no edge line, may be used as the terminal of the present disclosure depending on a need.

In the above embodiments, the blocking wall bodies 27 of adjacent two of the terminals 35 are spaced from each other. Alternatively, if it is possible to reduce the amount of the fuel stagnated around the second seal film, the blocking wall bodies of the adjacent two of the terminals 35 may be formed together. For example, the three blocking wall bodies 27 of the first embodiment may be formed together as a single blocking wall body.

In the first embodiment, the main film portion 41a and the auxiliary film portion 41b of the first seal film 40 are formed continuously. Alternatively, the main film portion and the auxiliary film portion may be formed separately from each other. However, it should be noted that in the case where the end portion of the seal film is located on the terminal made of the metal, peeling of the seal film may easily occur. Therefore, it is desirable to continuously form the main film portion and the auxiliary film portion together.

In the above embodiments, the terminals 35 are embedded into the inner case 21 in the inner case molding process, so that the projections 36 are formed to project from the first wall portion 25. Alternatively, the projections may be formed by assembling the terminals to the inner case after the molding of the inner case.

In the above embodiments, each seal film 40, 45 is made of the hydrin rubber. However, the material of the seal film is not limited to the hydrin rubber. A rubber material (elastomer), which is other than the hydrin rubber, or epoxy resin may be used as the material of the seal film. Furthermore, the process of forming the seal film is not limited to the baking process of the above embodiments.

In the above embodiments, the air bubbles, which are contained in the primer 49, come out from the surface of the primer 49, to form the small surface asperity 49a on the outer case contact surfaces 42, 46. Alternatively, the surface asperity 49a may be formed by recesses, each of which is configured into a crater form or, by projections, each of which is configured into a spine form. Furthermore, the method of forming the surface asperity in the outer case contact surfaces is not limited to the above method.

In the above embodiments, the blocking wall bodies 27 of the inner case 21 are provided to the terminals 35, respectively. Alternatively, a projection, which projects in the thickness direction TD, or a recess, which is recessed in the thickness direction TD, may be formed in a corresponding location of the terminal, which corresponds to the location of the blocking wall body 27. The projection and the recess discussed above are covered with the covering portion to limit the intrusion of the fuel to the area around the inner case main body.

In the above embodiments, there is described the exemplary case where the PPS resin is used as the material of the housing 20. However, the material of the housing 20 is not limited to the PPS resin, and the material of the housing 20 may be another type of resin material. Furthermore, the connection between the terminal 35 and the lead line 72 is not necessarily made by the welding.

In the above embodiments, the Hall IC is used as the sensor (sensing element). Alternatively, a contactless sensor (sensing element), such as a magnetoresistive sensor may be used as the sensor (sensing element) of the present disclosure.

The above discussion is made with respect to the exemplary case where the present disclosure is applied to the liquid level detection device 100 of the vehicle, which detects the remaining amount of the fuel. However, the application of the present disclosure is not limited to this type of liquid level detection device. That is, the liquid level detection device of the present disclosure may be a liquid level detection device, which detects a level of a surface of another liquid, such as brake fluid, engine coolant, engine oil contained in a vessel on the vehicle. Furthermore, the present disclosure may be appropriately applied to a liquid level detection device, which is placed in a liquid vessel of various consumer apparatuses, or various transport machines, which are other than the vehicle.

What is claimed is:

1. A liquid level detection device for detecting a level of a surface of liquid, comprising:
   a wall portion;
   a terminal that has a projection, which projects through the wall portion in a predetermined projecting direction;
   a covering portion that covers the wall portion and the projection; and
   a seal film that covers a corresponding portion of an outer peripheral surface of the projection and connects between the corresponding portion of the outer peripheral surface and the wall portion in an inside of the covering portion, wherein;
   a film thickness of a portion of the seal film progressively increases toward the wall portion along the corresponding portion of the outer peripheral surface;
   the portion of the seal film that progressively increases is joined to the wall portion; and
   the seal film is circumferentially surrounded by and is joined to the covering portion.

2. The liquid level detection device according to claim 1, wherein:
   the wall portion contacts the projection and seamlessly extends all around the projection in a circumferential direction;
   the covering portion contacts the seal film and seamlessly extends all around the seal film in the circumferential direction; and
   the portion of the seal film that progressively increases is held between the wall portion and the covering portion in the predetermined projecting direction.

3. The liquid level detection device according to claim 1, wherein a material of the wall portion is the same as a material of the covering portion.

4. The liquid level detection device according to claim 1, wherein:
   the wall portion is resin molded from a resin material; and
   the terminal is made of an electrically conductive metal material and is insert molded in the wall portion.

5. The liquid level detection device according to claim 1, wherein a cross section of the projection, which is taken in a direction perpendicular to the predetermined projecting direction, is polygonal.

6. The liquid level detection device according to claim 1, wherein the seal film has a surface asperity in a contact surface, which contacts the covering portion.

7. The liquid level detection device according to claim 1, wherein:
   the projection projects from a proximal end portion of the terminal in the predetermined projecting direction; and
   the liquid level detection device further comprises:
      a protruding portion that includes the wall portion and protrudes from the projection in a direction perpendicular to the predetermined projecting direction; and
      an inner case main body that is spaced from the protruding portion and receives the proximal end portion.

8. The liquid level detection device according to claim 7, wherein:
   the terminal is one of a plurality of terminals;
   the protruding portion is one of a plurality of protruding portions, which are provided to the plurality of terminals, respectively; and
   each adjacent two of the plurality of protruding portions are spaced from each other.

9. The liquid level detection device according to claim 1, wherein:
   the projection projects from a proximal end portion of the terminal in the predetermined projecting direction; and
   the liquid level detection device further comprises an inner case main body, which includes the wall portion and receives the proximal end portion.

10. The liquid level detection device according to claim 9, wherein:
    the seal film is a first seal film; and
    the liquid level detection device further comprises:
       a protruding portion that is spaced from the wall portion in the predetermined projecting direction and protrudes from the projection in a direction perpendicular to the predetermined projecting direction; and
       a second seal film that covers another corresponding portion of the outer peripheral surface of the projection and connects between the another corresponding portion of the outer peripheral surface and a wall surface of the protruding portion on a side of the protruding portion, which is opposite from the inner case main body in the predetermined projecting direction, in the inside of the covering portion, wherein a film thickness of the second seal film progressively increases toward the wall surface of the protruding portion along the another corresponding portion of the outer peripheral surface.

11. The liquid level detection device according to claim 10, wherein:
    the first seal film extends continuously from the wall portion to the protruding portion in the predetermined projecting direction along the outer peripheral surface of the projection; and
    the film thickness of the first seal film progressively increases toward the protruding portion along the outer peripheral surface of the projection.

12. The liquid level detection device according to claim 1, further comprising a sensor that is electrically connected to the terminal in the inside of the covering portion.

13. The liquid level detection device according to claim 12, further comprising:
    a stationary body that includes the covering portion, which holds the sensor in the inside of the covering portion; and
    a rotatable body that is rotatably supported by the stationary body and is configured to rotate relative to the stationary body in response to a change in the level of the surface of the liquid, wherein the sensor senses a rotational angle of the rotatable body relative to the stationary body.

14. The liquid level detection device according to claim 13, wherein the stationary body is installable with a fuel pump module received in a fuel tank of a vehicle.

15. A manufacturing method of the liquid level detection device of claim 1, comprising:

forming a subassembly that includes:
- the wall portion; and
- the terminal that has the projection, which projects through the wall portion in the predetermined projecting direction;

applying a seal material, which is dissolved in a solvent and is in a liquid state, to the wall portion and the projection;

solidifying the seal material to form the seal film that covers the corresponding portion of the outer peripheral surface of the projection and connects between the corresponding portion of the outer peripheral surface and the wall portion, wherein the film thickness of the seal film progressively increases toward the wall portion along the corresponding portion of the outer peripheral surface; and molding the covering portion from a resin material such that the covering portion covers the wall portion, and the seal film that in turn covers the corresponding portion of the outer peripheral surface of the terminal.

16. The manufacturing method of the liquid level detection device according to claim 15, wherein the forming of the subassembly includes resin molding the wall portion from a resin material over the terminal, which is made of an electrically conductive metal material, to insert mold the terminal in the wall portion.

17. The liquid level detection device according to claim 1, wherein:
- the terminal is made of an electrically conductive metal material; and
- the seal film directly contacts the electrically conductive metal material of the projection.

* * * * *